US012679090B2

(12) United States Patent
Nishida

(10) Patent No.: US 12,679,090 B2
(45) Date of Patent: Jul. 14, 2026

(54) DAMPER UNIT AND PRINTING APPARATUS

(71) Applicant: BROTHER KOGYO KABUSHIKI KAISHA, Nagoya (JP)

(72) Inventor: Katsunori Nishida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 114 days.

(21) Appl. No.: 18/590,473

(22) Filed: Feb. 28, 2024

(65) Prior Publication Data

US 2024/0286405 A1 Aug. 29, 2024

(30) Foreign Application Priority Data

Feb. 28, 2023 (JP) ................................. 2023-029175
Feb. 13, 2024 (JP) ................................. 2024-019373

(51) Int. Cl.
*B41J 2/14* (2006.01)
*B41J 2/175* (2006.01)

(52) U.S. Cl.
CPC ....... *B41J 2/14201* (2013.01); *B41J 2/17596* (2013.01)

(58) Field of Classification Search
CPC .............. B41J 2/175; B41J 2002/14419; B41J 2/17596; B41J 2/055; B41J 2/18; B41J 2/14201; B41J 2/17513; B41J 2/1433
See application file for complete search history.

(56) References Cited

U.S. PATENT DOCUMENTS

2016/0257126 A1* 9/2016 Ishida .................. B41J 2/14233

FOREIGN PATENT DOCUMENTS

JP 2006168350 A 6/2006

* cited by examiner

*Primary Examiner* — Jannelle M Lebron
(74) *Attorney, Agent, or Firm* — HOGAN LOVELLS US LLP

(57) ABSTRACT

A damper unit includes: a container including: a containing wall; and a damper film having flexibility and adhered to the containing wall, wherein the containing wall and the damper film define a containing space for containing a liquid to be supplied to a nozzle hole in a nozzle surface by a negative pressure during printing; and a plate member facing the damper film outside the container.

7 Claims, 8 Drawing Sheets

DAMPER UNIT AND PRINTING APPARATUS

REFERENCE TO RELATED APPLICATIONS

This application claims priority from Japanese Patent Application No. 2023-029175 filed on Feb. 28, 2023, and from Japanese Patent Application No. 2024-019373 filed on Feb. 13, 2024. The entire contents of the priority applications are incorporated herein by reference.

BACKGROUND ART

The present disclosure relates to a damper unit provided in a printing apparatus and a printing apparatus including the damper unit.

In the related art, it is known that a damper, to which a flexible damper film is welded, is disposed adjacent to an ejection head.

SUMMARY

Ink is supplied to the ejection head under a negative pressure. However, when the damper film receives a positive pressure in the related-art ejection head, the damper film may be peeled off.

An object of the present disclosure is to provide a damper unit capable of reducing a possibility that a damper film is peeled off even when the damper film receives a positive pressure, and a printing apparatus including the damper unit.

According to the present disclosure, there is provided a damper unit including: a container including: a containing wall; and a damper film having flexibility and adhered to the containing wall, wherein the containing wall and the damper film define a containing space for containing a liquid to be supplied to a nozzle hole in a nozzle surface by a negative pressure during printing; and a plate member facing the damper film outside the container.

According to the present disclosure, there is provided a printing apparatus including: a damper unit including: a container including: a containing wall; and a damper film having flexibility and adhered to the containing wall, wherein the containing wall and the damper film define a containing space for containing a liquid; a plate member facing the damper film outside the container; a nozzle surface including a nozzle hole to which the liquid is supplied by a negative pressure during printing, wherein the nozzle surface includes a first nozzle surface having a first nozzle hole as the nozzle hole and a second nozzle surface having a second nozzle hole as the nozzle hole; a first flow path configured to allow the liquid to be supplied to the first nozzle hole; and a second flow path configured to allow the liquid to be supplied to the second nozzle hole. The container includes: a first container configured to contain the liquid to be supplied to the first nozzle hole through the first flow path and including a first damper film as the damper film; and a second container configured to contain the liquid to be supplied to the second nozzle hole through the second flow path and including a second damper film as the damper film. The printing apparatus further includes: a first supply path configured to allow the liquid to be supplied to the first container; a second supply path configured to allow the liquid to be supplied to the second container; a first connection flow path connecting the first flow path and the second flow path; and a second connection flow path connecting the first supply path and the second supply path; and a pump provided in any one of the second connection flow path, the first supply path and the second supply path and configured to circulate the liquid through the first supply path, the first container, the first flow path, the first connection flow path, the second flow path, the second container, the second supply path, and the second connection flow path. The plate member is provided to face the damper film of one of the first damper film and the second damper film which receives a positive pressure in a state where the pump is activated.

According to the present disclosure, when the damper film receives a positive pressure and displaces, the plate member provided to face the damper film comes into contact with the damper film. Accordingly, the damper film can be prevented from being further displaced, and thus the possibility that the damper film is peeled off can be reduced.

According to the present disclosure, it is possible to provide a damper unit capable of reducing the possibility that a damper film is peeled off even when the damper film receives a positive pressure, and a printing apparatus including the damper unit.

DESCRIPTION

Hereinafter, a damper unit and a printing apparatus including the damper unit according to an embodiment of the present disclosure will be described with reference to the drawings. The damper unit and the printing apparatus to be described below are merely an embodiment of the present disclosure. Accordingly, the present disclosure is not limited to the following embodiments, and can be added, deleted, or modified without departing from the scope of the present disclosure.

Figure 1:
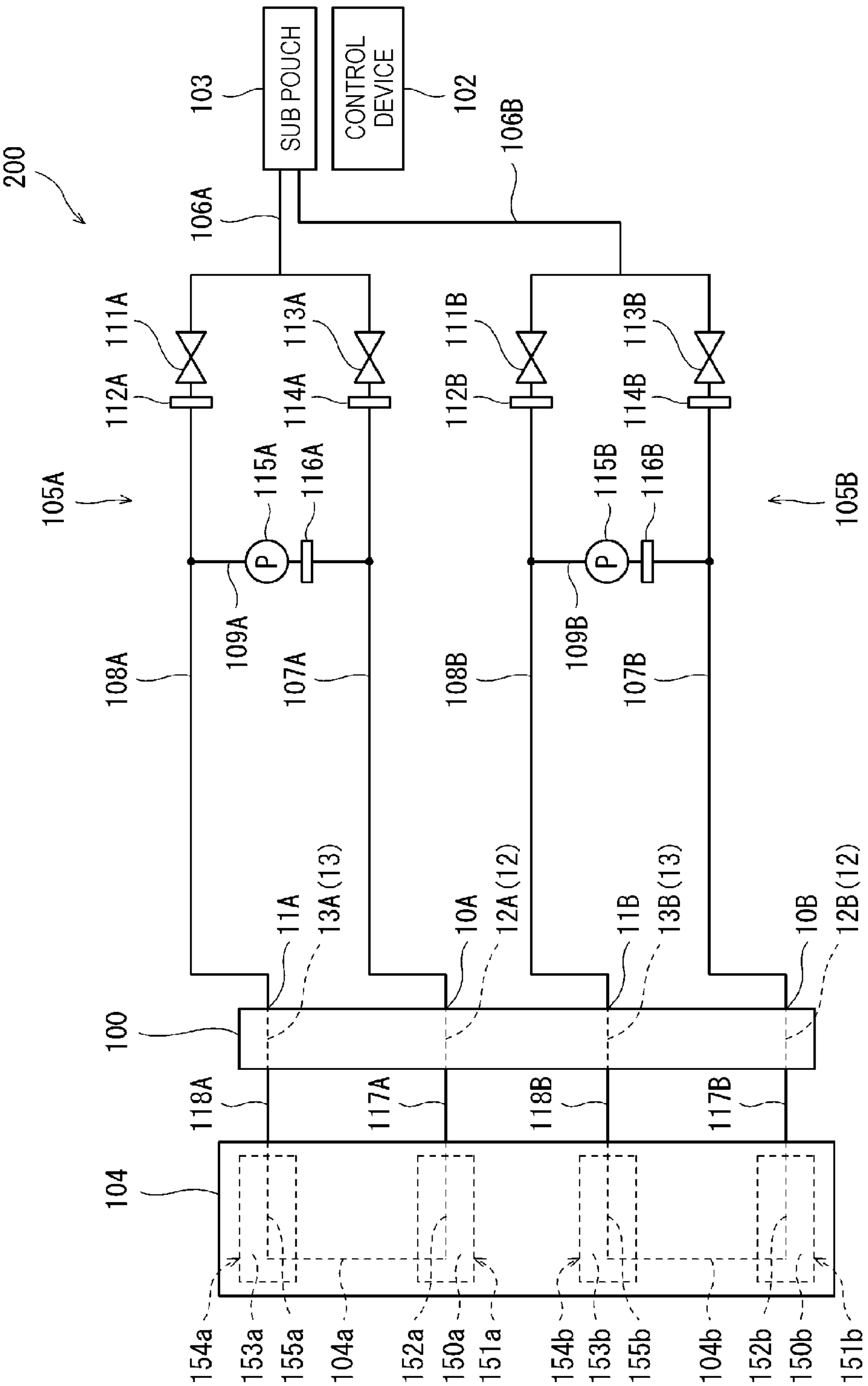
FIG. 1 is a block diagram illustrating main parts of a printing apparatus according to an embodiment.

FIG. 1 is a block diagram showing main parts of a printing apparatus 200 according to the present embodiment. The printing apparatus 200 performs printing by ejecting ink droplets of ink as an example of a liquid onto a printing medium such as printing sheet and fabric. The printing apparatus 200 prints a color image on a printing medium by ejecting ink droplets of yellow (Y), magenta (M), cyan (C), and black (K) inks, which are collectively referred to as color inks, onto the printing medium. In a case of printing a color image on a fabric serving as the printing medium, for example, ink droplets of a white ink (W) are first ejected as a base ink in order to reduce an influence on a color and a material of the fabric, and ink droplets of color inks are ejected on the ink droplets. Further, in a case of imparting gloss to a printed portion or protecting the printed portion, ink droplets of a clear ink (Cr) are ejected. The white ink contains an emulsion, and contains titanium oxide as a pigment. The titanium oxide has a relatively high specific gravity, and pigment particles are likely to be precipitated. Therefore, circulation process of the white ink is performed to prevent precipitation of the pigment particles. The circulation process of the white ink will be described in detail later.

Figure 2:
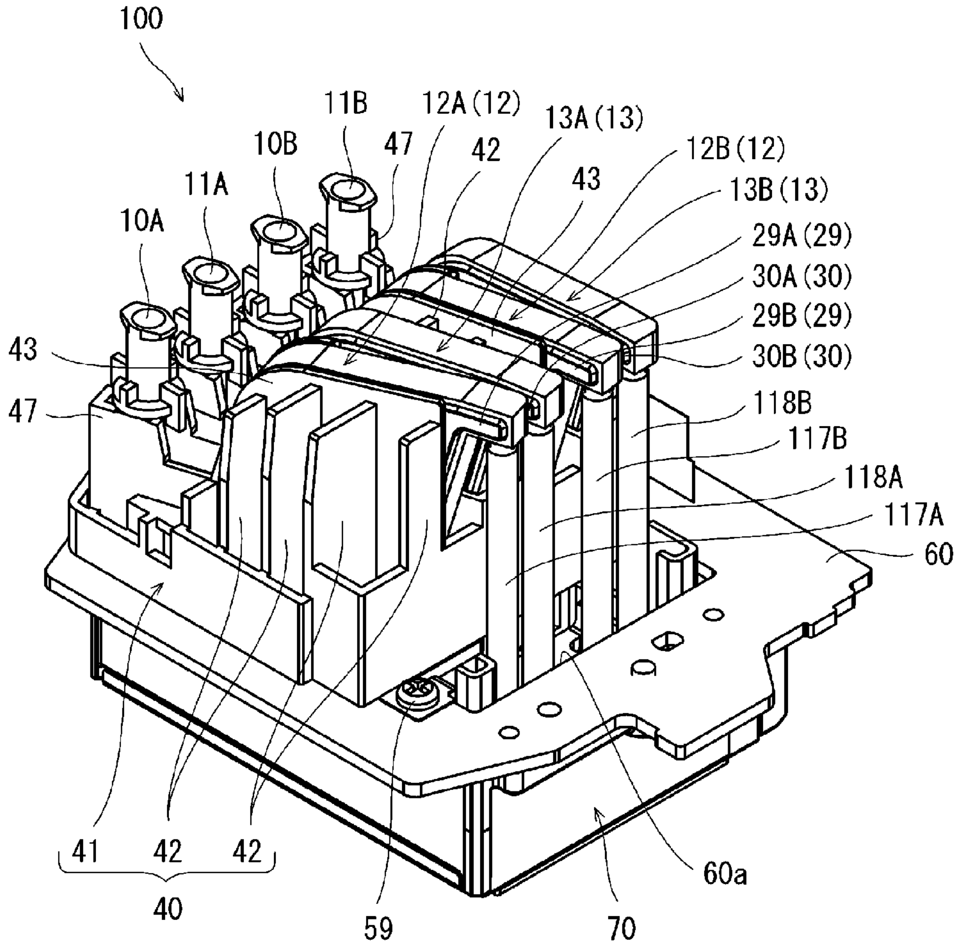
FIG. 2 is a perspective view showing a damper unit in the printing apparatus shown in FIG. 1.
Figure 2:
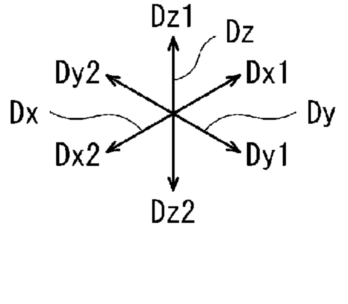

As shown in FIG. 1, the printing apparatus 200 includes a control device 102, a sub pouch 103, ink supply paths 105A, 105B, a damper unit 100, first flow paths 117A, 117B, second flow paths 118A, 118B, a head unit 104, and a head unit holder 70 (FIG. 2). The control device 102 includes a CPU, a memory, and the like.

The head unit 104 is held by the head unit holder 70. The head unit 104 includes, for example, four head portions, and includes manifolds 152*a*, 152*b*, 155*a*, and 155*b* and a first connection flow path 104*a*. A plurality of first nozzle holes 150*a* are in communication with the manifold 152*a*. A nozzle that is a tip end of each of the first nozzle holes 150*a* is formed in a first nozzle surface 151*a*. A plurality of second nozzle holes 153*a* are in communication with the manifold 155*a*. A nozzle that is a tip end of each of the second nozzle holes 153*a* is formed in a second nozzle surface 154*a*. The white ink in the manifolds 152*a*, 155*a* is guided to a pressure chamber (not shown). An ejection pressure is applied to the white ink, which is guided to the pressure chamber, by displacing a piezoelectric element serving as an actuator (not shown) in response to a drive signal. The white ink is ejected from the nozzle by the ejection pressure. The same applies to the manifolds 152*b*, 155*b*.

The sub pouch 103 stores the white ink. In the present embodiment, the sub pouch 103 is disposed on a side of the printing apparatus 200, for example, inside a housing.

Since the ink supply path 105B has the same configuration as the ink supply path 105A, the ink supply path 105A will be described below as a representative example. Further, concepts of upstream and downstream to be described below mean upstream and downstream when printing is performed using the white ink, unless otherwise specified during the circulation process of the white ink.

The ink supply path 105A includes an introduction path 106A, a first supply path 107A, a second supply path 108A, and a second connection flow path 109A. An upstream end of the introduction path 106A is connected to the sub pouch 103. An upstream end of the first supply path 107A is connected to a downstream end of the introduction path 106A, and an upstream end of the second supply path 108A is connected to the downstream end of the introduction path 106A. That is, the downstream end of the introduction path 106A branches into the first supply path 107A and the second supply path 108A.

One end of the second connection flow path 109A is connected to the first supply path 107A, and the other end of the second connection flow path 109A is connected to the second supply path 108A. Accordingly, the first supply path 107A and the second supply path 108A are connected by the second connection flow path 109A. A pump 115A is provided in the second connection flow path 109A. A filter 116A is provided on a downstream side of the pump 115A (that is, a downstream side in the circulation process) in the second connection flow path 109A. In the first supply path 107A, a solenoid valve 113A and a filter 114A are provided on an upstream side of a connection portion with the second connection flow path 109A. Further, in the second supply path 108A, a solenoid valve 111A and a filter 112A are provided on an upstream side of a connection portion with the second connection flow path 109A.

A downstream end of the first supply path 107A is connected to the port 10A of the damper unit 100, and a downstream end of the second supply path 108A is connected to the port 11A of the damper unit 100. A port 10A is connected to an upstream portion of a first container 12A (to be described later) of the damper unit 100, and a port 11A is connected to an upstream portion of a second container 13A (to be described later) of the damper unit 100. The white ink is supplied to the first container 12A through the first supply path 107A, and the white ink is supplied to the second container 13A through the second supply path 108A.

An upstream end of the first flow path 117A is connected to a downstream portion of the first container 12A, and an upstream end of the second flow path 118A is connected to a downstream portion of the second container 13A. A downstream end of the first flow path 117A is connected to an upstream portion of the manifold 152*a* of the head unit 104, and a downstream end of the second flow path 118A is connected to an upstream portion of the manifold 155*a* of the head unit 104. The first connection flow path 104*a* connects a downstream portion of the manifold 152*a* during the circulation process and an upstream portion of the manifold 155*a* during the circulation process. Accordingly, the first flow path 117A and the second flow path 118A are connected by the first connection flow path 104*a*.

In the above configuration, during printing using the white ink, that is, when the white ink is supplied to the manifolds 152*a*, 155*a* of the head unit 104, the solenoid valves 111A, 113A are opened by the control device 102. Accordingly, the white ink in the sub pouch 103 is supplied to the introduction path 106A by a water head, and then supplied to the first supply path 107A and the second supply path 108A. The white ink supplied to the first supply path 107A flows through the filter 114A to remove foreign matter in the white ink, and the white ink supplied to the second supply path 108A flows through the filter 112A to remove foreign matter in the white ink.

The white ink flowing through the first supply path 107A is supplied to the first container 12A of the damper unit 100 via the port 10A, and the white ink flowing through the second supply path 108A is supplied to the second container 13A of the damper unit 100 via the port 11A. Configurations of the first container 12A and the second container 13A will be described in detail later.

The white ink flowing through the first container 12A is supplied to the manifold 152*a* of the head unit 104 via the first flow path 117A. Ink droplets of the white ink supplied to the manifold 152*a* are ejected onto the printing medium through the first nozzle holes 150*a*. In this way, the white ink is supplied to the first nozzle holes 150*a* through the first flow path 117A. Similarly, the white ink flowing through the second container 13A is supplied to the manifold 155*a* of the head unit 104 via the second flow path 118A. Ink droplets of the white ink supplied to the manifold 155*a* are ejected onto the printing medium through the second nozzle holes 153*a*. In this way, the white ink is supplied to the second nozzle holes 153*a* through the second flow path 118A. As described above, printing using the white ink is performed. Printing using the ink supply path 105B is performed in the same manner as the printing using the ink supply path 105A.

Next, the circulation process of the white ink will be described. In the circulation process of the white ink, the solenoid valves 111A, 113A are closed by the control device 102. In a state where the solenoid valves 111A, 113A are closed, the pump 115A is driven by the control device 102. Accordingly, the white ink is discharged from the pump 115A, flows through the first supply path 107A, and then is supplied to the first container 12A of the damper unit 100 via the port 10A. The white ink flowing through the first container 12A is supplied to the manifold 152*a* of the head unit 104 through the first flow path 117A. Thereafter, the white ink flows through the first connection flow path 104*a* and flows through the manifold 155*a*. The white ink flowing through the manifold 155*a* flows through the second flow path 118A and then flows through the second container 13A of the damper unit 100. The white ink flowing through the second container 13A flows through the second supply path 108A via the port 11A. The white ink flowing through the second supply path 108A is drawn into the pump 115A, and then circulates in the same manner as described above. As described above, the pump 115A circulates the white ink through the first supply path 107A, the first container 12A, the first flow path 117A, the first connection flow path 104*a*, the second flow path 118A, the second container 13A, the second supply path 108A, and the second connection flow path 109A. The circulation process using the ink supply path 105B is performed in the same manner as the circulation process using the ink supply path 105A.

Figure 3:
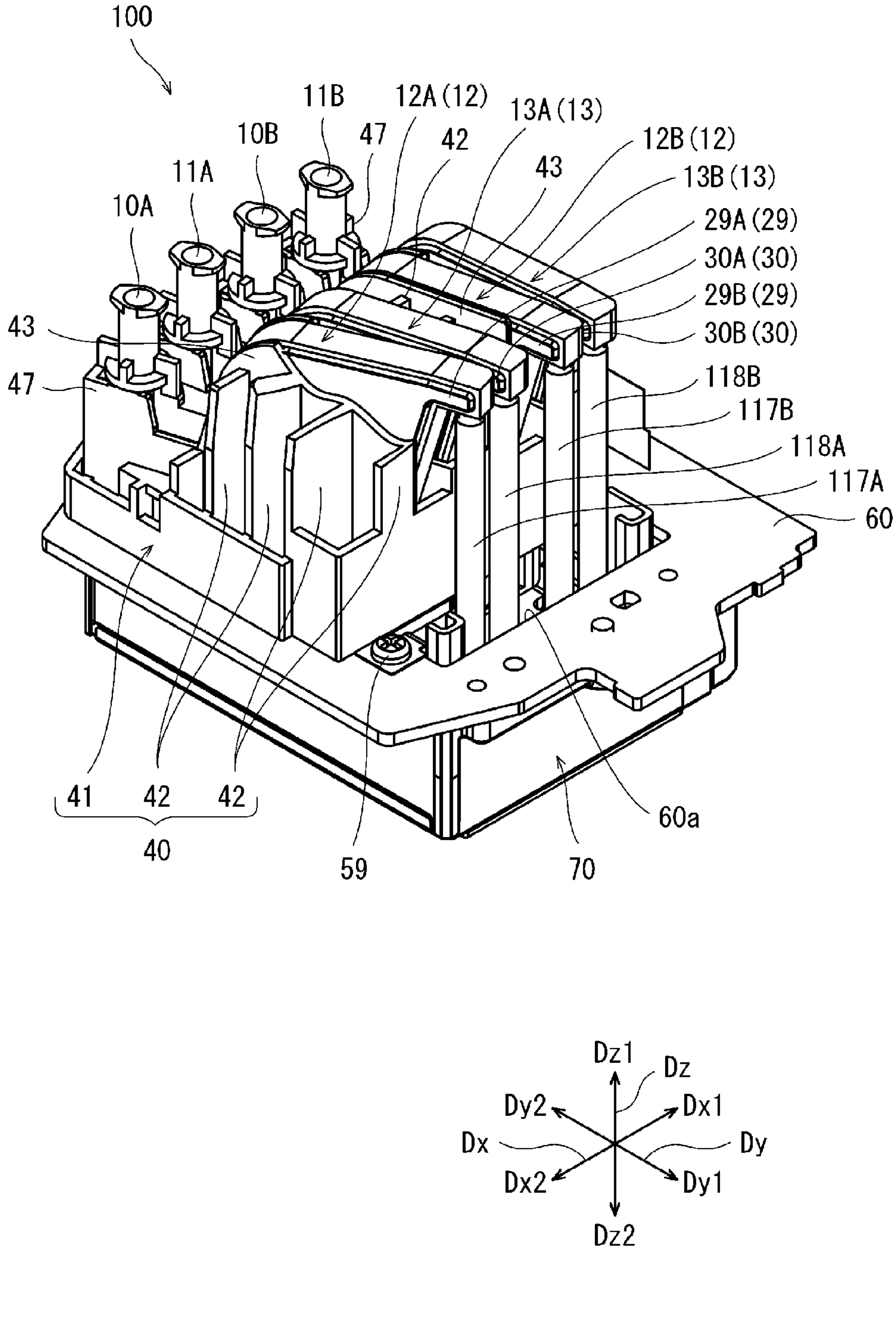
FIG. 3 is a perspective view in which a plate member of the damper unit shown in FIG. 2 is cut out for a damper film to be viewed.
Figure 4:
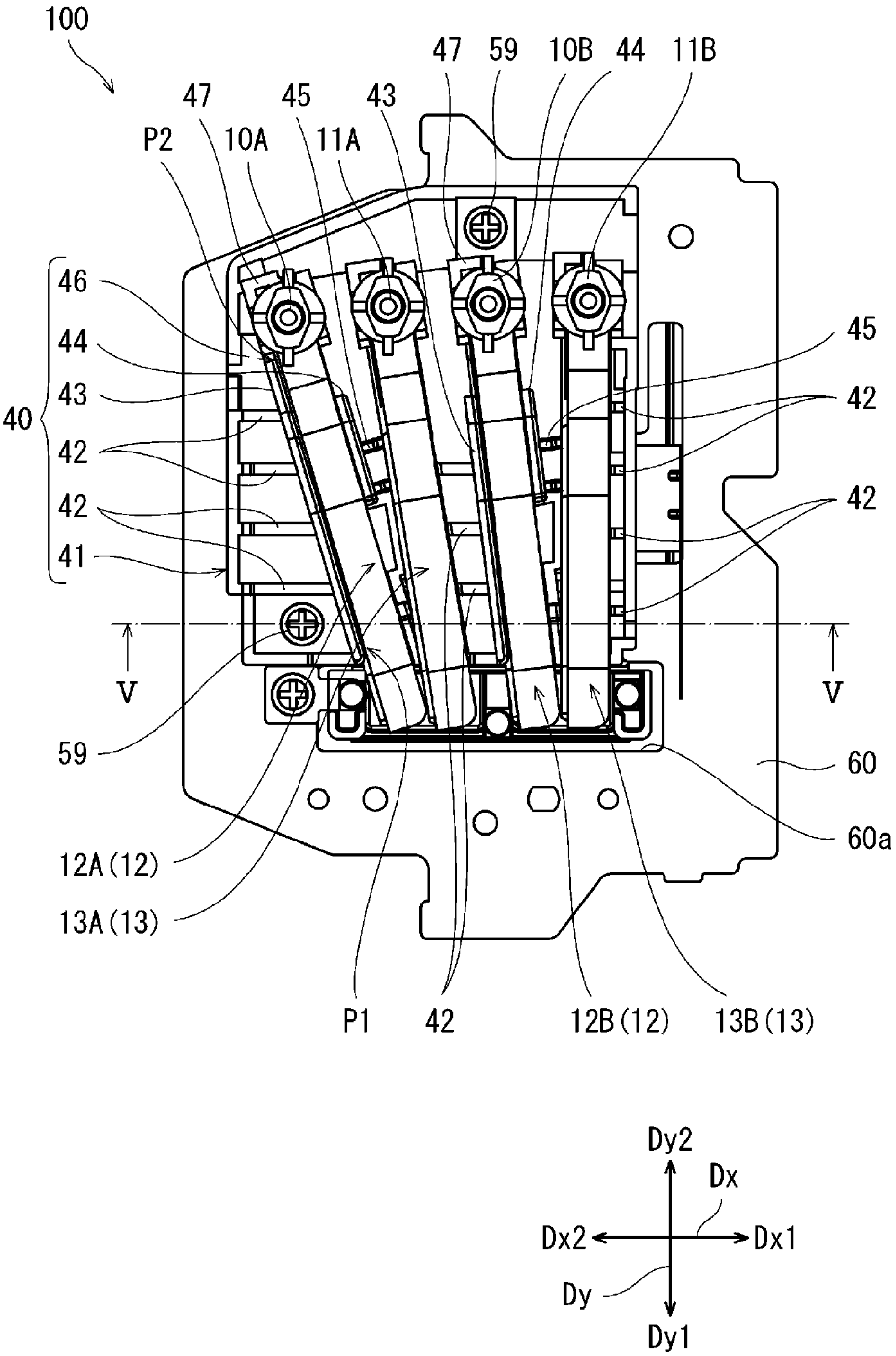
FIG. 4 is a plan view of the damper unit shown in FIG. 2.
Figure 5:
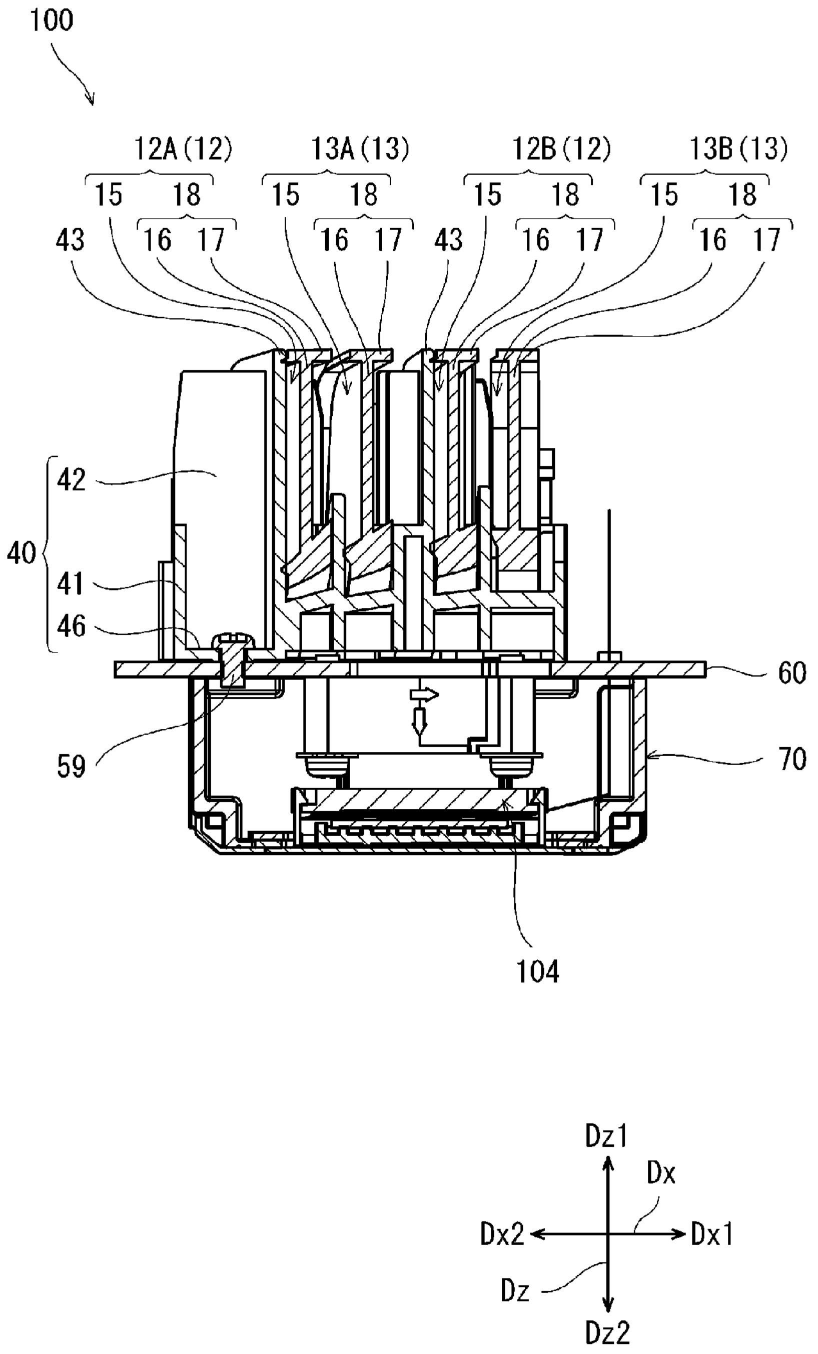
FIG. 5 is a cross-sectional view taken along a line V-V in FIG. 4.
Figure 6:
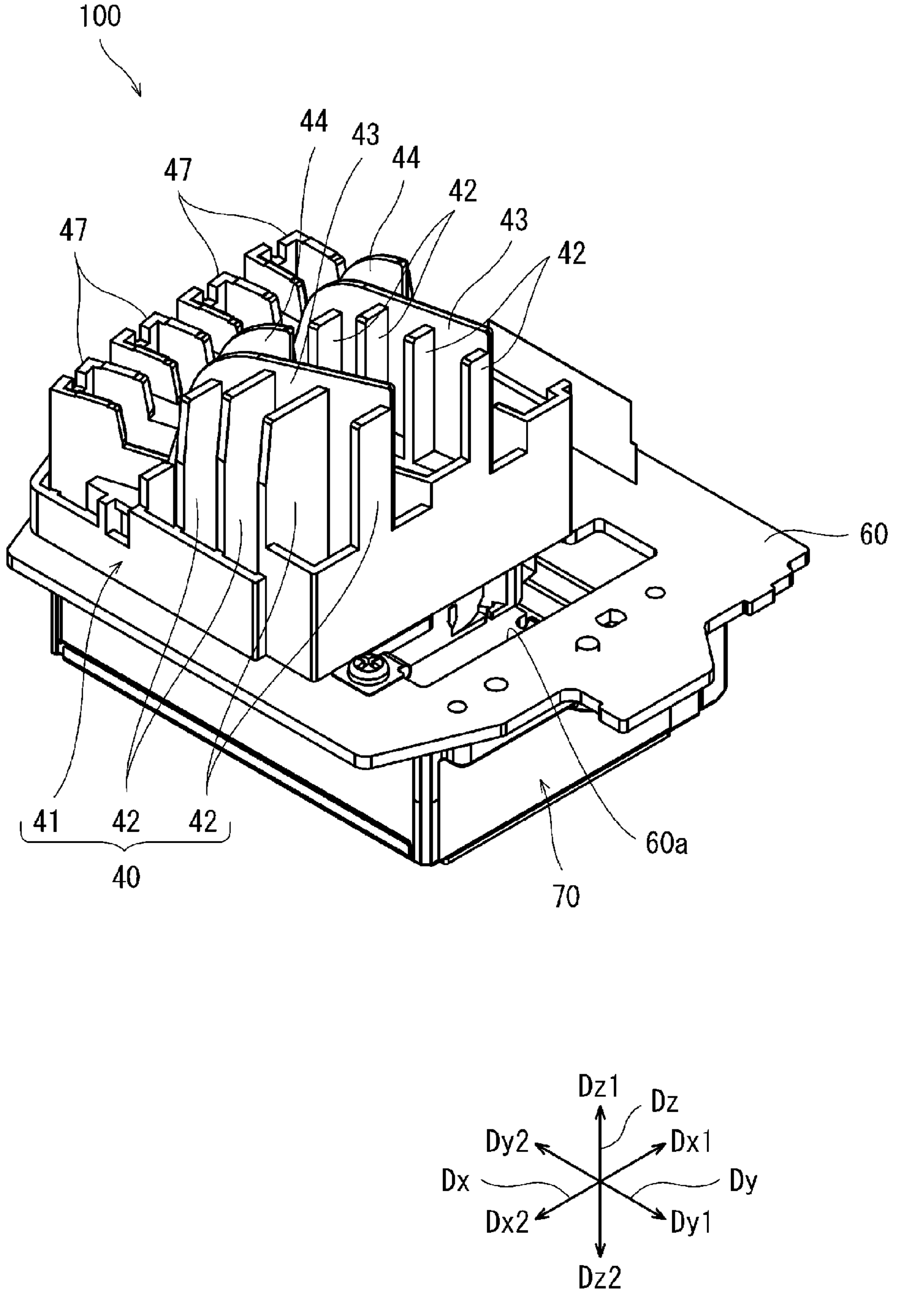
FIG. 6 is a perspective view showing a head holder upper of the damper unit shown in FIG. 2.

Hereinafter, a configuration of the damper unit 100 will be described in detail. FIG. 2 is a perspective view showing the damper unit 100 in the printing apparatus 200 in FIG. 1. FIG. 3 is a perspective view in which a plate member 43 of the damper unit 100 in FIG. 2 is cut out to make it easy to see a first damper film 29A. FIG. 4 is a plan view of the damper unit 100 in FIG. 2. FIG. 5 is a cross-sectional view taken along a line V-V in FIG. 4. FIG. 6 is a perspective view showing a head holder upper 40 of the damper unit 100 in FIG. 2. In FIGS. 2 to 6, directions orthogonal to one another are referred to as a first direction Dx, a second direction Dy, and a third direction Dz. The first direction Dx is, for example, a left-right direction (main scanning direction), the second direction Dy is, for example, a front-rear direction (sub-scanning direction), and the third direction Dz is, for example, an upper-lower direction. One side of the first direction Dx is denoted by Dx1, and an opposite direction of the direction Dx1 is denoted by Dx2. One side of the second direction Dy is denoted by Dy1, and an opposite direction of the direction Dy1 is denoted by Dy2. One side of the third direction Dz is denoted by Dz1, and an opposite direction of the direction Dz1 is denoted by Dz2. However, all of the above directions are examples and are not limited.

As shown in FIGS. 2 to 6, the damper unit 100 includes two first containers 12, two second containers 13, the head holder upper 40, and a support plate 60. The two first containers 12 include a first container 12A and a first container 12B. The two second containers 13 include a second container 13A and a second container 13B. The first containers 12A, 12B and the second containers 13A, 13B correspond to "containers" of the present disclosure.

The head holder upper 40 is made of resin, for example. The head holder upper 40 includes a frame 41, support walls 42, plate members 43, support members 44, a support walls 45, and a bottom portion 46. The frame 41 includes two frame portions extending in the first direction Dx and separated from each other in the second direction Dy, and two frame portions extending in the second direction Dy and separated from each other in the first direction Dx. The frame 41 is supported by the bottom portion 46.

The first containers 12A, 12B and the second containers 13A, 13B are provided inside the frame 41. The first containers 12A, 12B and the second containers 13A, 13B may be configured to be detachable with respect to the frame 41. The first containers 12A, 12B have a first damper film 29 having flexibility, and the second containers 13A, 13B have a second damper film 30 having flexibility. The first damper film 29 and the second damper film 30 are made of synthetic resin such as polypropylene (PP) or polyethylene (PE). The first damper film 29 includes a first damper film 29A corresponding to the first container 12A and a first damper film 29B corresponding to the first container 12B. The second damper film 30 includes a second damper film 30A corresponding to the second container 13A and a second damper film 30B corresponding to the second container 13B. The first damper film 29 and the second damper film 30 correspond to a "damper film" of the present disclosure.

The first container 12A stores the white ink to be supplied to the first nozzle holes 150*a* through the first flow path 117A. The first container 12B stores the white ink to be supplied to the first nozzle holes 150*b* through the first flow path 117B. The second container 13A stores the white ink to be supplied to the second nozzle holes 153*a* through the second flow path 118A. The second container 13B stores the white ink to be supplied to the second nozzle holes 153*b* through the second flow path 118B. The downstream portion of the first container 12A is formed in a tapered shape, and the upstream end of the first flow path 117A is connected to the downstream portion.

As shown in FIG. 5, the first container 12A includes a containing space 15, a containing wall 18, and the first damper film 29A. The containing space 15 contains the white ink to be supplied to the first nozzle holes 150*a* by a negative pressure during printing. The containing wall 18 defines a part of the containing space 15. The containing wall 18 includes a facing wall 16 located opposite the first damper film 29A with the containing space 15 interposed therebetween, and adhesive walls 17 extending from an upper end and a lower end of the facing wall 16 and to which the first damper film 29A is adhered. The first damper film 29A is adhered to the adhesive walls 17 of the containing wall 18 to define the other part of the containing space 15. A method of adhering the first damper film 29A to the adhesive walls 17 may be, for example, welding or adhering using an adhesive. In the present embodiment, the first damper film 29A is welded to the adhesive walls 17. Configurations of the first container 12B and the second containers 13A, 13B are the same as the configuration of the first container 12A.

For example, two plate members 43 are provided. Each of the plate members 43 extends on the bottom portion 46. One plate member 43 is provided to face the first damper film 29A outside the first container 12A. The other plate member 43 is provided to face the first damper film 29B outside the first container 12B. The plate member 43 is not provided for the second damper films 30A, 30B. The plate member 43 provided to face the first damper film 29A is spaced from the first damper film 29A when an internal pressure of the first container 12A and an external pressure of the first container 12A are the same. The same applies to the plate member 43 provided to face the first damper film 29B.

For example, a plurality of support walls 42 are provided for one plate member 43. An end portion of each support wall 42 on a direction Dx1 side is connected to a surface of the plate member 43 on a direction Dx2 side. In FIG. 4, each support wall 42 extends, for example, in the first direction Dx and supports the plate member 43. Each support wall 42 supports a surface of the plate member 43 on a side opposite to a side where the first damper film 29A or 29B is located. As shown in FIGS. 4 and 5, each support wall 42 that supports the plate member 43 provided to face the first damper film 29A extends on the bottom portion 46 while being connected to a frame portion of the frame 41 that extends in the second direction Dy and is located on a direction Dx2 side. On the other hand, each support wall 42 that supports the plate member 43 provided to face the first damper film 29B extends on the bottom portion 46. In FIGS. 4 and 5, the first damper films 29A, 29B and the second damper films 30A, 30B are not shown.

Figure 7:
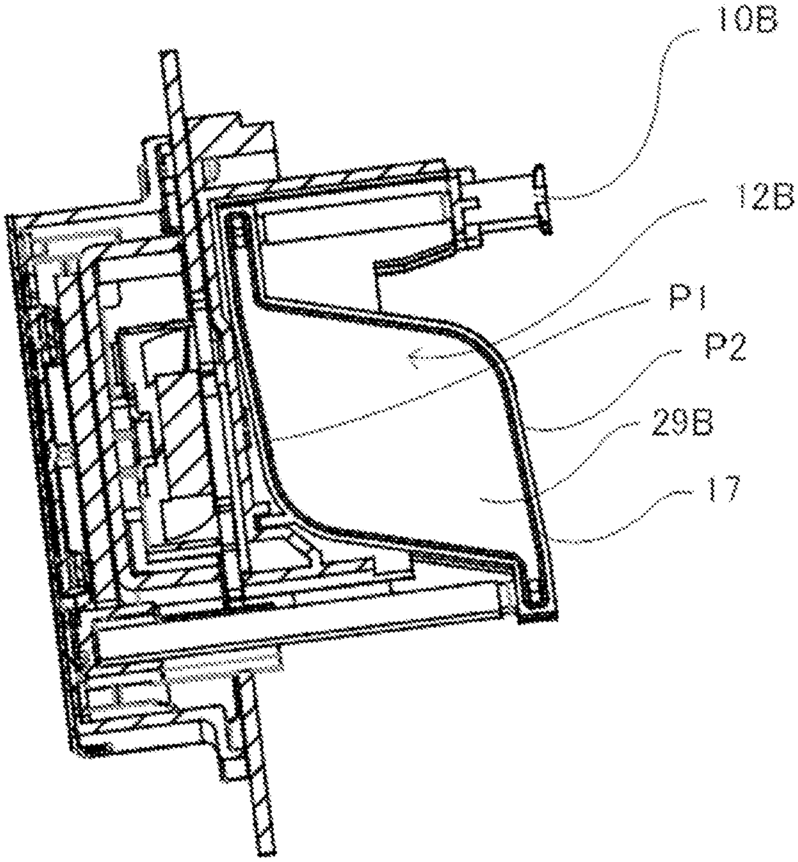
FIG. 7 is a view of a first container 12B shown in FIG. 2 from a direction Dx2 perpendicular to a surface of a damper film 29B, wherein a plate member 43 and a supporting wall 42 are omitted.
Figure 8:
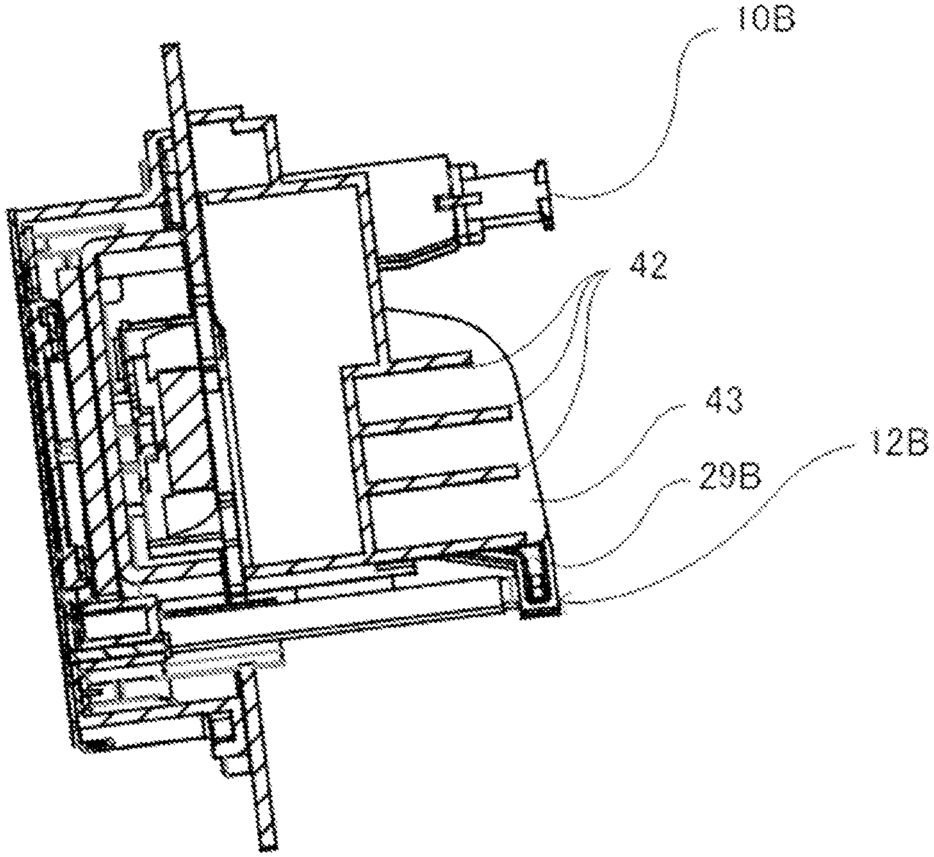
FIG. 8 is a view of the first container 12B shown in FIG. 2 from the direction Dx2 perpendicular to the surface of the damper film 29B, showing the plate member 43 and the supporting wall 42.

Each plate member 43 faces a central portion of a corresponding one of the first damper films 29A, 29B. The central portion of each of the first damper films 29A, 29B is a central portion in an extending direction of each of the first damper films 29A, 29B in a plan view (that is, a plan view in FIG. 4). The central portion of each of the first damper films 29A, 29B is located between a first connection part P1 and a second connection part P2 at which each of the first damper films 29A, 29B is connected to the adhesive walls 17 of the containing wall 18. The plate member 43 faces the central portion of each of the first damper films 29A, 29B. The plate member 43 at least faces a center of a corresponding one of the first damper films 29A, 29B in the extending direction. For example, as shown in FIG. 7, it is sufficient for the center to be an imaginary inscribed circle that is in contact with an adhesion portions of the adhesive wall 17 with the housing wall 18. Additionally, as shown in FIG. 7, the central portion may be considered as a collection of points in a region between the center of the imaginary inscribed circle and the adhesion portions of the adhesive wall 17 with the housing wall 18. As shown in FIG. 8, the plate member 43 faces at least the central portion of the first damper film 29B. The same applies to the plate member 43 facing the first damper film 29B.

For example, two support members 44 are provided. Each support member 44 extends on the bottom portion 46, and is provided to face the facing wall 16. One support member 44 is provided to face the facing wall 16 of the first container 12A. The other support member 44 is provided to face the facing wall 16 of the first container 12B.

For example, a plurality of support walls 45 are provided for one support member 44. An end portion of each support wall 45 on a direction Dx2 side is connected to a surface of the support member 44 on a direction Dx1 side. Each support wall 45 extends on the bottom portion 46. Each support wall 45 supports the support member 44. Each support wall 45 supports a surface of the support member 44 on a side opposite to a side where the first container 12A or 12B are located.

The bottom portion 46 is fixed to the support plate 60 by a plurality of fixtures 59 such as screws. Four port holders 47 are provided inside the frame 41 on a direction Dy2 side. The ports 10A, 11A, 10B, and 11B are held by the port holders 47. The support plate 60 is provided with a through hole 60*a*. The first flow paths 117A, 117B and the second flow paths 118A, 118B extend in the third direction Dz in a state of being inserted through the through hole 60*a*. The head unit holder 70 is attached to a lower surface of the support plate 60.

As shown in FIG. 4, in a plan view, the second container 13B extends in a direction parallel to the second direction Dy, whereas the first containers 12A, 12B and the second container 13A extend along a direction intersecting the second direction Dy. Accordingly, a gap between two port holders 47 located outermost in the first direction Dx among the four port holders 47 is larger than a gap between the downstream portion of the first container 12A and the downstream portion of the second container 13B. Accordingly, when an operator maintains the head unit 104, the first supply paths 107A, 107B and the second supply paths 108A, 108B are easily removed from the corresponding ports, the flow path resistance of each port is maintained, and the damper unit 100 is downsized.

Here, when the circulation process of the white ink is performed, the pump 115A is driven in a state where the solenoid valves 111A, 113A are closed as described above. Accordingly, the white ink is discharged from the pump 115A, flows through the first supply path 107A, and then is supplied to the first container 12A of the damper unit 100 via the port 10A. On the other hand, when the pump 115A is driven, the white ink in the second supply path 108A is drawn into the pump 115A. Therefore, the first damper film 29A of the first container 12A receives a positive pressure, and the second damper film 30A of the second container 13A receives a negative pressure. As a result, the internal pressure of the first container 12A is higher than the external pressure of the first container 12A, and the first damper film 29A tends to bulge outward. However, since the plate member 43 is disposed to face the first damper film 29A, the first damper film 29A slightly bulges and displaces toward the plate member 43, but comes into contact with the plate member 43 after the displacement.

In this way, the first damper film 29A is not further displaced by coming into contact with the plate member 43. Accordingly, a load can be prevented from being applied to the welded portion of the first damper film 29A, and the first damper film 29A can be restricted or prevented from being peeled off from the adhesive walls 17. Further, since a predetermined gap is provided between the plate member 43 and the first damper film 29A as described above, a displacement region of the first damper film 29A is secured. Accordingly, a dynamic pressure caused by printing can be absorbed by the first damper film 29A displacing by a certain amount during the printing. During the circulation process of the white ink, a pressure (positive pressure) applied to the first damper film 29A is, for example, about +20 kPa, and a pressure (negative pressure) applied to the second damper film 30A is, for example, about −20 kPa. Further, a pressure (negative pressure) applied to the first damper film 29A and the second damper film 30A due to the suction of the white ink by the actuator during printing is, for example, about −1 kPa, which is smaller than that during the circulation process.

As described above, according to the damper unit 100 of the present embodiment, in a case where the first damper films 29A, 29B bulge by receiving the positive pressure during the circulation process of the white ink, the plate members 43 provided to face the first damper films 29A, 29B come into contact with the first damper films 29A, 29B. Accordingly, the first damper films 29A, 29B can be prevented from being further displaced. Accordingly, the possibility that the first damper films 29A, 29B are peeled off from the adhesive walls 17 can be reduced.

In the present embodiment, the plate members 43 are disposed to face the central portions of the first damper films 29A, 29B. Accordingly, the central portions of the first damper films 29A, 29B that bulge most when receiving the positive pressure can come into contact with the plate members 43. Accordingly, the central portions of the first damper films 29A, 29B can be prevented from bulging more than a certain amount.

Further, in the present embodiment, each plate member 43 faces a portion extending from the one portion P1 to the other portion P2, which are located sandwiching the central portion of the first damper film 29A or 29B, among adhesion portions between the first damper film 29A or 29B and the adhesive walls 17. Accordingly, the portion of the first damper film 29A or 29B, which includes the central portion and extends from the one portion P1 to the other portion P2, can be prevented from bulging more than a certain amount. As a result, a wide range bulging of the first damper films 29A, 29B can be prevented, and thus the reliability of capable of preventing the peeling of the first damper films 29A, 29B is further improved.

Further, in the present embodiment, the plate members 43 are provided with gaps from the first damper films 29A, 29B when the internal pressures of the first containers 12A, 12B and the external pressures of the first containers 12A, 12B are the same. Accordingly, the displacement regions of the first damper films 29A, 29B are secured. Accordingly, dynamic pressures caused by printing can be absorbed by the first damper films 29A, 29B displacing by a certain amount during the printing. That is, damper functions of the first damper films 29A, 29B during printing are also ensured.

In the present embodiment, the support members 44 are provided facing the facing walls 16 outside the first containers 12A, 12B. Accordingly, when the first damper films 29A, 29B come into contact with the plate members 43 and receive a pressure in a direction opposite to a contact direction from the plate members 43, the first containers 12A, 12B can be prevented from tilting in the opposite direction.

Further, in the present embodiment, the plate members 43 are provided to face the first damper films 29A, 29B, which receive the positive pressure when the pumps 115A, 115B are driven, among the first damper films 29A, 29B and the second damper films 30A, 30B. In other words, the plate members 43 are not provided for the second damper films 30A, 30B which receive the negative pressure when the pumps 115A, 115B are driven. This contributes to cost reduction and weight reduction of the damper unit 100.

MODIFICATION

The present disclosure is not limited to the above-described embodiment, and modifications can be adopted without departing from the gist of the present disclosure. For example, the present disclosure is modified as follows.

In the above-described embodiment, the pump 115A is provided in the second connection flow path 109A, but the present disclosure is not limited thereto, and the pump 115A may be provided in the first supply path 107A or the second supply path 108A. Further, the pump 115B is provided in the second connection flow path 109B, but the present disclosure is not limited thereto, and the pump 115B may be provided in the first supply path 107B or the second supply path 108B.

Further, in the above-described embodiment, the white ink in the sub pouch 103 is supplied to the introduction path 106A by the water head, but the present disclosure is not limited thereto, and the ink in the sub pouch 103 may be supplied to the introduction path 106A by a pump as long as the white ink can be supplied to the nozzle holes by a negative pressure during printing.

In the above-described embodiment, four manifolds including the manifolds 152*a*, 152*b*, 155*a*, and 155*b* are provided in the head unit 104, but the present disclosure is not limited thereto, and for example, one manifold may be provided in the head unit 104. In this case, a circulation flow path through which the white ink circulates via the one manifold by driving the pump 115A is also provided.

Further, as described above, the number of manifolds may be one or more, and the number of containers may be one or more.

In the above-described embodiment, the plate members 43 are provided to face the first damper films 29A, 29B, but are not limited thereto, and may also be provided to face the second damper films 30A, 30B. Further, the support wall 42 may be provided corresponding to the plate member 43.

Further, in an aspect where the plate members 43 are provided to face the second damper films 30A, 30B as described above, the support member 44 may be provided corresponding to the plate member 43. Further, the support wall 45 may be provided corresponding to the support member 44.

Further, in the above-described embodiment, the plate member 43 faces a portion extending from the one portion P1 to the other portion P2, which are located sandwiching the central portion of the first damper film 29A in the extending direction, among adhesion portions between the first damper film 29A and the adhesive walls 17 of the containing wall 18, but the present disclosure is not limited thereto. As long as the plate members 43 can be disposed to face centers of the first damper films 29A, 29B in the extending direction, a length of the plate member 43 in the extending direction is not limited to the above.

In the above-described embodiment, the sub pouch 103 may be a so-called on-carriage type sub-tank mounted on a carriage. In this case, the sub-tank is connected to a main tank via a tube.

Further, in the above-described embodiment, the white ink is used as the liquid to be circulated, but the present disclosure is not limited thereto, and the present disclosure can be similarly applied to a case where a liquid other than the white ink is circulated.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A damper unit comprising:
a container including:
a containing wall; and
a damper film having flexibility and adhered to the containing wall, wherein the containing wall and the damper film define a containing space for containing a liquid to be supplied to a nozzle hole in a nozzle surface by a negative pressure during printing; and
a plate member arranged at a position outside the container and facing the damper film and the plate member comes into contact with the damper film during circulation of the liquid.

2. The damper unit according to claim 1,
wherein the plate member faces a central portion of the damper film.

3. The damper unit according to claim 2, wherein the damper film is connected to the containing wall at a first connection part and a second connection part, wherein the damper film includes a central portion that is located between the first connection part and the second connection part, wherein the plate member faces the central portion of the damper film.

4. The damper unit according to claim 1, wherein the plate member is separated from the damper film in a state where an internal pressure of the container and an external pressure of the container are equal to each other.

5. The damper unit according to claim 1, further comprising a support member, wherein the containing wall includes a facing wall located opposite the damper film with the containing space interposed therebetween, and wherein the support member faces the facing wall outside the container.

6. The damper unit according to claim 1, wherein the plate member contacts with the damper film during circulation of the liquid.

7. A printing apparatus comprising:

a damper unit including:

a container including:

a containing wall; and a damper film having flexibility and adhered to the containing wall, wherein the containing wall and the damper film define a containing space for containing a liquid; and a plate member arranged at a position outside the container and facing the damper film and the plate member comes into contact with the damper film during circulation of the liquid;

a nozzle surface including a nozzle hole to which the liquid is supplied by a negative pressure during printing, wherein the nozzle surface includes a first nozzle surface having a first nozzle hole as the nozzle hole and a second nozzle surface having a second nozzle hole as the nozzle hole;

a first flow path configured to allow the liquid to be supplied to the first nozzle hole; and a second flow path configured to allow the liquid to be supplied to the second nozzle hole, wherein the container includes:

a first container configured to contain the liquid to be supplied to the first nozzle hole through the first flow path and including a first damper film as the damper film; and a second container configured to contain the liquid to be supplied to the second nozzle hole through the second flow path and including a second damper film as the damper film, wherein the printing apparatus further comprises:

a first supply path configured to allow the liquid to be supplied to the first container;

a second supply path configured to allow the liquid to be supplied to the second container;

a first connection flow path connecting the first flow path and the second flow path; and a second connection flow path connecting the first supply path and the second supply path; and a pump provided in any one of the second connection flow path, the first supply path and the second supply path and configured to circulate the liquid in a closed loop through the first supply path, the first container, the first flow path, the first connection flow path, the second flow path, the second container, the second supply path, and the second connection flow path, and wherein the plate member is provided to face the damper film of one of the first damper film and the second damper film which receives a positive pressure in a state where the pump is activated.

* * * * *